US 11,196,780 B2

(12) United States Patent
Archer et al.

(10) Patent No.: US 11,196,780 B2
(45) Date of Patent: Dec. 7, 2021

(54) METHOD AND SYSTEM FOR ADAPTED MODALITY CONFERENCING

(71) Applicant: Mitel Networks (International) Limited, London (GB)

(72) Inventors: Myles Archer, San Jose, CA (US); Jorge Paez Munoz, San Jose, CA (US); Logendra Naidoo, Ontario (CA)

(73) Assignee: Mitel Networks (International) Limited, London (GB)

( * ) Notice: Subject to any disclaimer, the term of this patent is extended or adjusted under 35 U.S.C. 154(b) by 0 days.

(21) Appl. No.: 16/537,467

(22) Filed: Aug. 9, 2019

(65) Prior Publication Data

US 2021/0044635 A1    Feb. 11, 2021

(51) Int. Cl.
*H04L 29/06* (2006.01)
*H04L 29/08* (2006.01)
*H04L 12/58* (2006.01)

(52) U.S. Cl.
CPC ...... *H04L 65/4015* (2013.01); *H04L 65/1069* (2013.01); *H04L 65/403* (2013.01); *H04L 65/605* (2013.01); *H04L 67/02* (2013.01); *H04L 51/066* (2013.01)

(58) Field of Classification Search
CPC ............. H04L 12/1813; H04L 12/2803; H04L 12/2834; H04L 12/2898
See application file for complete search history.

(56) References Cited

U.S. PATENT DOCUMENTS

| 6,101,320 A * | 8/2000 | Schuetze ............... H04L 51/066 709/201 |
| 8,027,276 B2 | 9/2011 | Nierhaus |
| 2003/0142798 A1* | 7/2003 | Gavette ................... H04M 1/57 379/88.12 |
| 2004/0019645 A1* | 1/2004 | Goodman ............... H04L 67/02 709/206 |
| 2005/0034079 A1* | 2/2005 | Gunasekar ............. G06Q 10/10 715/753 |
| 2005/0058075 A1 | 3/2005 | Gorday et al. |

(Continued)

FOREIGN PATENT DOCUMENTS

TR    2018 12392 A2    9/2018
WO   WO 2020/046251 A2   3/2020

*Primary Examiner* — Barbara B Anyan (57) ABSTRACT

Systems and methods for conferencing are disclosed. The systems and methods receive, by a computer-based system in electronic communication with a first communication endpoint and a second communication endpoint, a first communication comprising communication data. The systems and methods determine, by the computer-based system, a first communication media type of the first communication endpoint and a second communication media type of the second communication endpoint. Additionally, the systems and methods convert, by the computer-based system, the communication data into a second communication formatted according to the first communication media type or the second communication media type and transmit, by the computer-based system, the first communication or the second communication to the first communication endpoint and the second communication endpoint based on a communication media type of each communication endpoint.

19 Claims, 5 Drawing Sheets

(56) References Cited

U.S. PATENT DOCUMENTS

| | | | |
|---|---|---|---|
| 2012/0147127 A1* | 6/2012 | Satterlee | H04N 7/152 |
| | | | 348/14.08 |
| 2012/0259722 A1* | 10/2012 | Mikurak | G06Q 50/12 |
| | | | 705/26.1 |
| 2015/0378531 A1* | 12/2015 | Bansal | H04L 65/1069 |
| | | | 348/14.03 |
| 2016/0006985 A1* | 1/2016 | Hines | H04N 13/167 |
| | | | 348/14.08 |
| 2016/0132608 A1* | 5/2016 | Rathod | H04W 4/21 |
| | | | 707/722 |
| 2016/0269349 A1* | 9/2016 | Bolinger | H04L 12/1822 |
| 2019/0109884 A1 | 4/2019 | Karapantelakis et al. | |

* cited by examiner

METHOD AND SYSTEM FOR ADAPTED MODALITY CONFERENCING

FIELD OF THE INVENTION

The present disclosure generally relates to methods and systems for electronic communication. More particularly, the disclosure relates to methods and systems for conferencing.

BACKGROUND OF THE DISCLOSURE

Electronic communications, such as audio and video conference sessions are often used to allow participants in various locations to "virtually" participate in a conference in real-time. Such communications allow participants in different locations to participate in discussion without having to travel to a common location.

Conferencing solutions today may be based around real-time audio communication, real-time video communication, or some combination of real-time audio communication and real-time video communication. Because of increased collaboration efforts these days, conferences that are held with participants that are in different environments and sometimes different parts of the world are becoming more and more common. A conference today may require all participants to have an audio microphone, a video-capable device, or both. Additionally, users may preferably have to be in a quiet setting to participate in a conference. Sometimes, one or more participants may not have access to the requirements of an audio microphone, a video-capable device, a quiet setting, or some combination of these, e.g., at a time for a particular conference or during at least a portion of a particular conference.

For example, some users may not be able to join the audio portion of a conference, the video portion of a conference, or both the audio portion and the video portion of a conference. Not being able to join the audio portion of a conference, the video portion of a conference, or both the audio portion and the video portion of a conference is becoming increasingly common and may lock such users out of the main focus of the conference. Having users that are unable to join either the audio portion of a conference or the video portion of a conference may greatly reduce the value of the conference, not only for those users, but for other users in the conference that may rely on a wide variety of user input to accomplish the goals of the particular conference. Furthermore, some users may be unable to join both the audio portion and the video portion of the conference. Such users cannot participate in the conference in real-time and may have to rely on post-conference transcripts, if they exist. Having to rely on post-conference transcripts may delay feedback from these users that could have been given during the conference. Accordingly, the conference as a whole may be impacted because of delays in feedback and delays in comments to such feedback by other members of the conference.

Relying on chat during a conference may have shortcomings. A chat may be a separate communication from the main communication of the conference. For example, a window on a computer monitor that includes a video conference may be separate from a window on the computer monitor that includes the chat. Accordingly, most users in the chat may be focused on the video conference rather than the chat. Additionally, a chat may generally only contain topics related to the act of the conference itself rather than the content of the conference. For example, chat may be used for troubleshooting the conference rather than conducting the conference. Even if the chat were updated with meeting notes, this would require a participant in the audio/video portion of the conference to take notes manually and update the chat.

Relying on traditional office-based electronic communications, such as audio and video conference sessions in the workplace also present shortcomings. For example, when a user is away from the office, logged out of the user's desktop environment, and/or the user's work-based smartphone is turned off, problems may be created with respect to conference discussions. For example, the user may miss key conference-based discussions occurring during times when the user is away from the office, logged out of the user's desktop environment, and/or the user's work-based smartphone is turned off. As a result, a participant who is present in the meeting would have to transcribe or paraphrase the meeting and use an alternate means to contact the absent user, such as social media (e.g., Facebook or LinkedIn messaging). Transcribing or paraphrasing the meeting and contacting an absent user using alternative means is generally labor-intensive for team member or members performing such tasks. Such a labor-intensive solution would burden team members to reach out to their co-worker (in this example) and attempt to contact them or relay critical information. In some cases, the use of social media may not be taken advantage of at all leading to the likelihood of missing a meeting entirely.

Being able to receive conference data in a format that allows a user to participate in an active conference without needing to use audio/video is a current gap in the conferencing solution. Accordingly, improved methods and system for conferencing are desired. In particular, improved techniques for interacting with conference participants that may not have access to audio or video devices or participants that may be located in a location where the use of audio or video devices is not convenient may be desired.

Any discussion of problems provided in this section has been included in this disclosure solely for the purposes of providing a context for the present invention, and should not be taken as an admission that any or all of the discussion was known at the time the invention was made.

BRIEF DESCRIPTION OF THE DRAWING FIGURES

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements and wherein:

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present invention.

DETAILED DESCRIPTION OF EXEMPLARY EMBODIMENTS

The description of exemplary embodiments of the present invention provided below is merely exemplary and is intended for purposes of illustration only; the following description is not intended to limit the scope of the invention disclosed herein. Moreover, recitation of multiple embodiments having stated features is not intended to exclude other embodiments having additional features or other embodiments incorporating different combinations of the stated features.

As set forth in more detail below, exemplary embodiments of the disclosure provide systems and methods for conferencing that may include mixed modality conferencing. Mixed modality conferencing may allow a user to enter a conference using one or more of video conferencing, audio conference, or text conferencing. Additionally, mixed modality conferencing may translate between one or more of the video conferencing, audio conference, or text conferencing so that users of each of the video conferencing, audio conference, or text conferencing may communicate more easily with each other.

Some systems may use post-conference transcriptions or chat functionality that is separate from the main medium of the conference. Post-conference transcriptions may be created, but post-conference transcription's usefulness may be limited due to a delay of information given to the participants. If a participant has a question or concern about a given topic in the conference, the participant will only be able to raise these concerns after the conference has ended.

Some solutions may provide real-time conference transcriptions of audio, but do not provide a good mechanism for participation in the conference outside of using chat functionality. The chat functionality may be an option for participation in the conference without using any audio, video, or without using both audio and video, but due to the focus on the audio portion of the conferencing, the chat portion does not always get noticed or included in the discussion of the conference. Accordingly, the chat may be limited and may not allow users to fully participate in the conference to an extent that may be wanted or desired.

In an aspect, a conference may encompass alternative means of receiving conference data. The alternative means of receiving conference data may allow users to participate actively in a conference. Such a conference may be referred to as a mixed modality conference. Mixed modality conferencing may allow users to send and receive data using a modality that is available and/or convenient to each individual user regardless of whatever modality or modalities may be available or convenient to another user or users. Transmitting data in a modality that is available or convenient to a user may allow a user to add content to the conference. Receiving data in a modality that is available or convenient to a user may allow a user to receive content from the conference. Receiving content from the conference may allow users to use, consume, or consider such data and provide comments to such data during the course of the conference.

As discussed above, mixed modality conferencing may allow a user to enter a conference using one or more of video conferencing, audio conference, or text conferencing because a mixed modality conferencing system may allow for translating between one or more of the video conferencing, audio conference, or text conferencing (or other modalities) so that users of each of the video conferencing, audio conference, or text conferencing may communicate more easily with each other. Furthermore, mixed modality conferencing may allow users that are in a communication that is dropped to reestablish communications using one or more other modalities. For example, assume a first user is communicating with a second user using one of short message service (SMS), i.e., "text," chat (e.g., WhatsApp, Facebook, Skype, or other chat platform) or other communication platform such as a voice communication. Further assume that the first user becomes unavailable. Accordingly, the system may propose an alternate means to communicate. For example, the system may adapt the first communication endpoint and/or the second communication endpoint to create a new endpoint that the system may suggest to one or more of the first user and the second user. For example, assume the first user and the second user are talking over a voice telephone call, but the voice telephone call is dropped. In an aspect, the system may transmit one or more text messages to one or more users with details on continuing the communication, e.g., with one or more of the first user or the second user using an alternative mean of commination. For example, one or more users may be required to switch the means of communication. For example, the first user and the second user may switch from a direct telephone call to a conference call. One or more of the first user and the second user may switch from the direct telephone call to text-based messaging or other method of communication within such a conference call using the system and methods described herein. The example above assumes two users. It will be understood that the systems and methods described herein may be applied to calls or other communications including more than two users.

An aspect may allow conferences to support mixed modes of data reception and participation in a conference. Using mixed modes may allow a wider variety of users to have ways to participate more fully in a conference. For example, a participant in the conference could choose to participate in the conference throughout an audio modality, a video modality, a text modality, an email modality, a social media modality, or some combination of the audio modality, the video modality, the social media modality, the text modality, and the email modality.

The text and email modalities may use real-time or near real-time text-to-speech technologies to allow the user to participate in the conference. For example, the user may send text messages into the conference. The text may be transmitted to users of the conference that receive information by text. The text messages may be converted to speech or audio so that users who may wish to receive the conference using speech or audio have that option. Accordingly, both the text and the speech or audio may be used in the conference depending on the needs of the particular users assembled for the conference.

The text and email modalities may also use real-time or near real-time speech-to-text to allow the user to receive data related to the conference. For example, the user may read material from other conference participants. In an aspect, the material may be material that originated from another conference participant as text or the material may be material that originated from another conference participant as speech and was converted to text. Similarly, the audio modality and the video modality (e.g., including audio) may use real-time or near real-time speech-to-text and real-time or near real-time text-to-speech technologies to allow for interaction with users using text and email modalities.

An aspect may be used with respect to social media. Social media is an area that may use a large amount of both audio and text-based communication. Variants of this idea may be able to leverage the text and speech engines to deliver communication in a different way than the communication was produced. Another aspect may make use of automatic conversion of one media format to another, e.g., between audio and text, for jobs that may often be in audio sensitive environments to relay information to their employees. The conversion of the media format to social media may also result in social media utility based posts. For example, a post may result in a delivery of communication in a different way than the communication was originally produced. In an aspect, a user's media stream (e.g., post to their Facebook wall, posting through a user's Twitter stream, or their LinkedIn feed, or other social media stream) may receive posts originally from other social media streams or non-social media formats. For example, voice data in a teleconference may be converted to text and posted automatically.

Some conferencing systems may use audio. Some conferencing systems may use video and audio. An aspect aims to expand from audio (or video and audio) to also include any text-based medium. Accordingly, clients whose preferred method is text-based may receive updated transcripts of the conference and may be able to participate in the conference by responding with text. Aspects may allow users who are not available to use audio (or video) to be added to conferences. The text only clients may not normally be able to join a conference. Accordingly, the systems and methods described herein may increase the availability of the conference to a wider variety of users. Other clients may wish to use the audio or video formats for participating in a conference. In an aspect, the audio format, the video format, or the audio and video format may also be available. Accordingly, in an aspect, users of one or more of audio, video, and text (or other formats) may be able to participate in real-time or near real time in a conference using mixed modality conferencing.

In an aspect, mixed modality conferencing may allow clients to join a conference with their respective preferred method of participating and receiving content. For example, mixed modality conferencing clients may use one or more of video conferencing, audio conference, or text conferencing. Text conferencing may include at least one or more of a short message service (SMS) text, a multimedia message service (MMS) text, an email, a chat, a web-based text platform, or other text-based messaging services or systems. Thus, mixed modality conferencing may allow a wide variety of clients to join a conferences using a modality that may be best for a particular user's device(s), location, or circumstances.

For example, mixed modality conferencing may allow one client to use video conferencing, another client to use an audio conference, and a third client to use text conferencing. Combinations of mixed modality conferencing may also be used. For example, a client may be able to watch video from a conference, e.g., slides being presented, and listen to audio from the conference (using earbuds or other audio devices, for example). In an aspect, the client may not be able to respond verbally to the conference for fear of being overheard, e.g., in an airport. Thus, such a client may respond by text. Other combinations of mixed modality conferencing may also be used.

Figure 1:
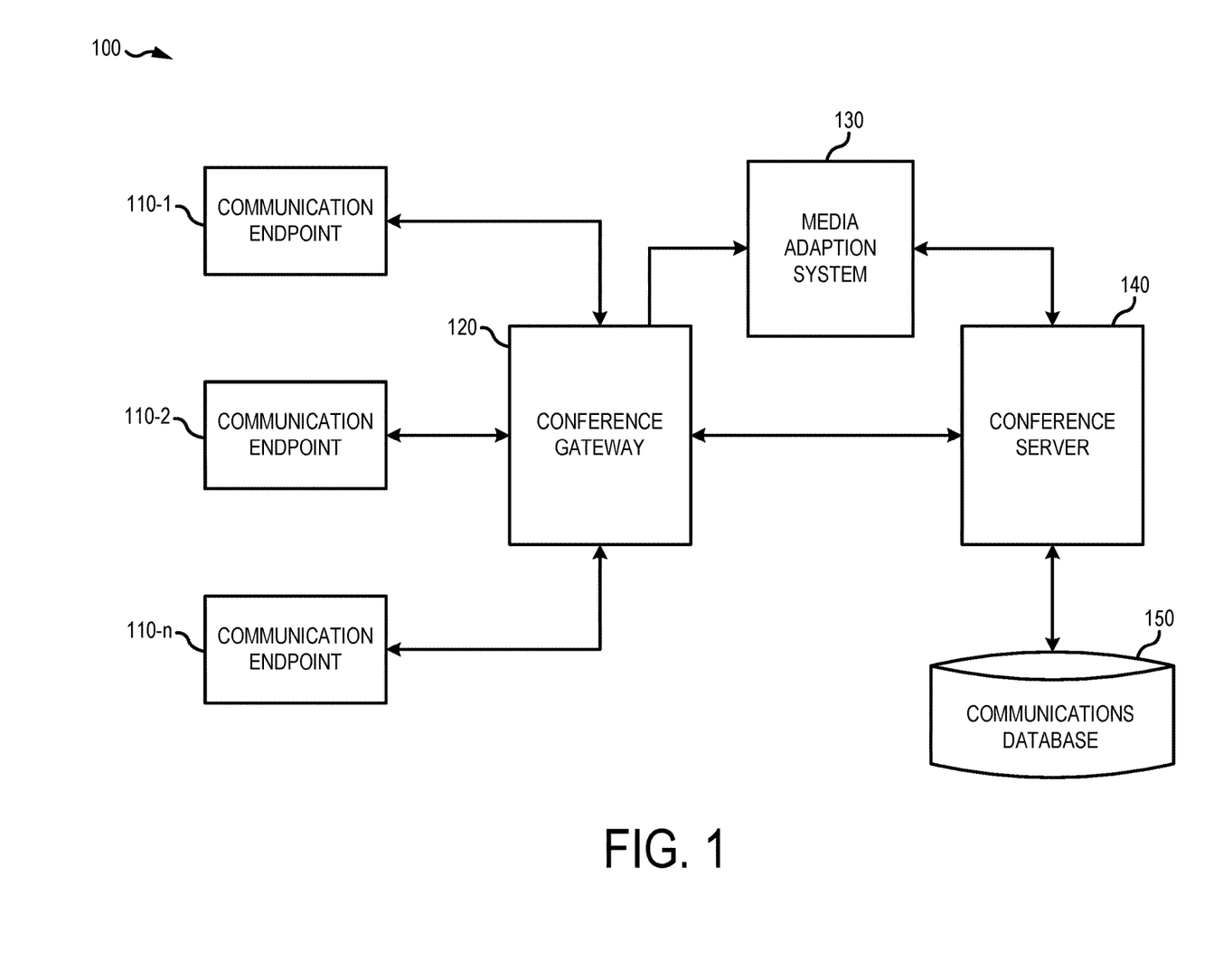
FIG. 1 illustrates a conference system in accordance with exemplary embodiments of the disclosure.

FIG. 1 illustrates a conference system 100 in accordance with exemplary embodiments of the disclosure. The conference system 100 may include four main components. The conference system may also include the communication endpoints 110 that may be used by clients of the conference system 100. The first component of the conference system 100 may be a conference gateway 120 which the clients (e.g., at communication endpoints 110) may talk to directly. The conference gateway 120 may be responsible for routing incoming conference information to the correct component to be processed. The conference gateway 120 may also distribute the conference content to the clients using their preferred medium, e.g., through the endpoints 110. In an aspect, the conference gateway 120 does not handle any of the processing or conversion of content and simply is used to coordinate the types of information being passed to and from the conference through the endpoints 110.

The second and third components may be a text-to-speech engine and a speech-to-text engine. The text-to-speech engine and a speech-to-text engine may be included in the media adaption system 130. The media adaption system 130 is discussed in greater detail with respect to FIG. 2, below. The media adaption system 130 may be responsible for converting speech to text and text to speech, e.g., using the speech-to-text engine or the text-to-speech engine, respectively. The media adaption system 130 may sit between the conference gateway 120 and the conference server 140.

In an aspect, when an audio user talks on a client (communication endpoint 110), the audio user's audio may be sent to the conference gateway 120 which may route the audio directly to the conference server 140 as well as the speech-to-text engine within the media adaption system 130. The speech-to-text engine within the media adaption system 130 may convert the speech to text and send the text converted from the speech to the conference server 140. The speech-to-text engine may also contain voice recognition technology which may allow the speech-to-text engine to differentiate between different users on the same audio endpoint (communication endpoint 110).

When a text-based user sends a text message from their client (communication endpoint 110), the conference gateway may route the text to both the conference server 140 and the text-to-speech engine of the media adaption system 130. The text-to-speech engine of the media adaption system 130 may send the resulting speech to the conference server 140. Sending the resulting speech to the conference server 140 may result in the conference server having both the audio form of the conference and the text form of the conference. The speech-to-text component of the media adaption system 130 may be engaged before the conference server 140 so that the speech of individual clients may be converted before the conference audio is merged. The speech of individual clients being converted before the conference audio is merged may leads to more accurate translation, avoiding translation issues that could arise from multiple clients talking at the same time.

The conference server 140 may be a communication server that may receive audio, video, and text representation of each client's input to the conference. When the conference server 140 feeds the content back to the clients (e.g., at communication endpoint 110), the conference server 140 may do so by sending the content to the conference gateway 120. When a client is a text client, the text form of the content may be sent to the gateway and forwarded to that client. When the client is an audio client, then the audio form of the content may be sent to the gateway and forwarded to that client. When the client is a video client, then the video form of the content may be sent to the gateway and forwarded to that client. When the client is both an audio and video, then the audio and video forms of the content may be sent to the gateway and forwarded to that client.

The components may allow for the ability for a conference to receive audio, video, audio and video, text, or some combination of these as inputs. The components may also allow for the ability to produce audio, video, audio and video, text, or some combination of these for the conference system's clients. Each client may have its own respective settings of which format the client may wish to use or be able to use. Each client having its own settings for format may allow each user, including users who are unable to use the audio portion of a conference to still participate in the conference.

In an aspect, the systems and methods described herein may allow for live streaming of information from a conference or sending and receiving information using some other method. For example, text messaging, email, and other methods of transmissions.

The communications database 150 may include one or more of a text transcript database, an audio recording database, or a video recording database which may store text transcripts, audio recordings, or video recordings for the conference server 140.

Figure 2:
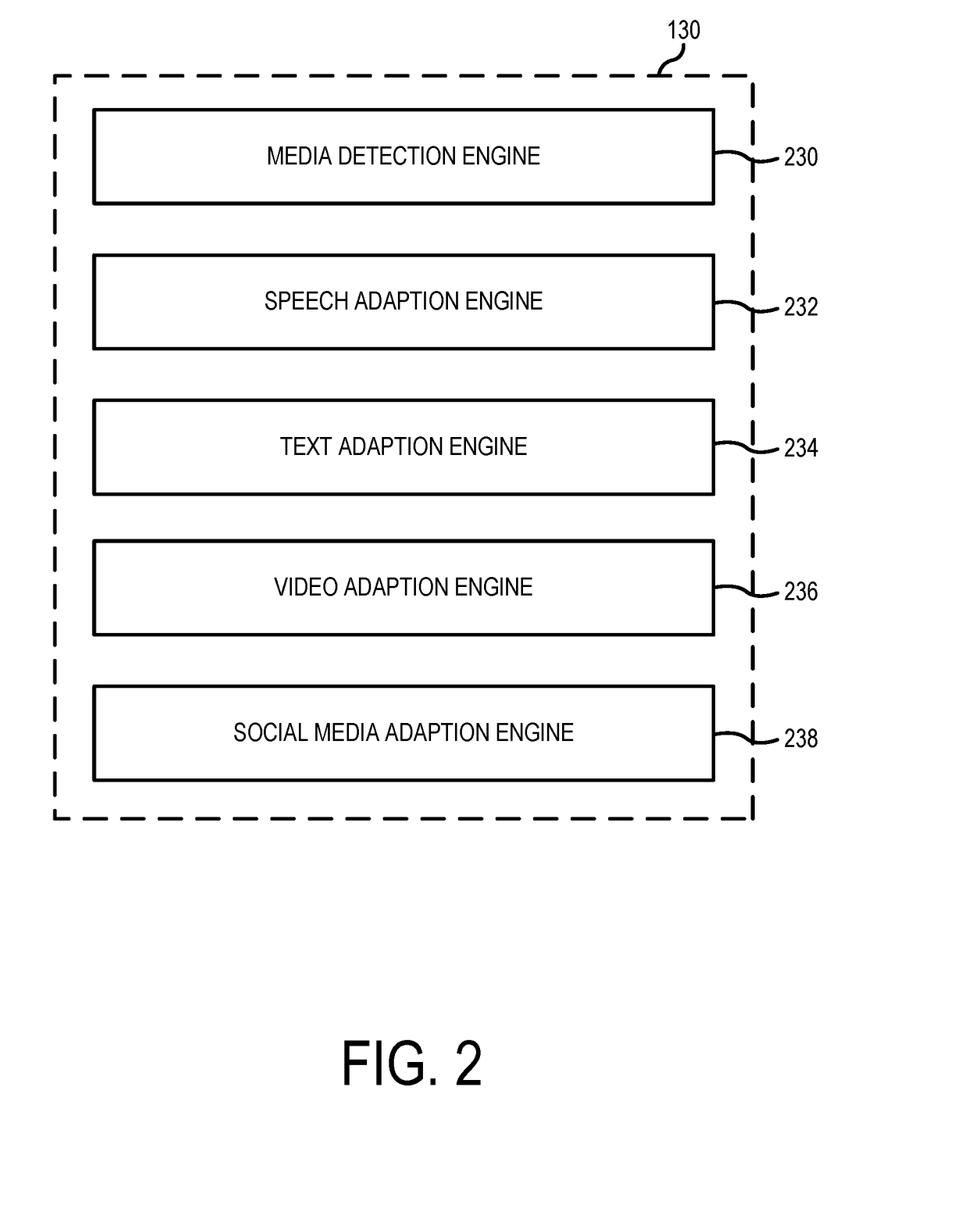
FIG. 2 illustrates an example media adaption system of FIG. 1 in accordance with exemplary embodiments of the disclosure.

FIG. 2 illustrates the example media adaption system 130 of FIG. 1 in accordance with exemplary embodiments of the disclosure. The media adaption system 130 may include a media detection engine 230, a speech adaptation engine 232 (e.g., speech-to-text engine), a text adaptation engine 234 (e.g., text-to-speech engine), a video adaptation engine 236, and a social media adaptation engine 238.

The media detection engine 230 may be used to determine a type of media received. For example, the media detection engine 230 may determine when data received is speech data, text data, video data, some other type of data, or a combination of one or more of speech data, text data, video data, or some other type of data. Accordingly, the media detection engine 230 may direct the data to an appropriate adaptation engine.

When the media detection engine 230 determines that the data received is speech data, the data received may be communicated to the speech adaptation engine 232 (e.g., the speech-to-text engine). Similarly, when the media detection engine 230 determines that the data received is text data, the data received may be communicated to the text adaptation engine 234 (e.g., the text-to-speech engine). When the media detection engine 230 determines that the data received is video data, the data received may be communicated to the video adaptation engine 236, which may include a video processing engine to process the video data. When the media detection engine 230 determines that the data received is social media data, the data received may be communicated to the social media adaptation engine 238. When the media detection engine 230 determines that the data received is a combination of one or more of speech data, text data, video data, or some other type of data, the data received may be communicated to one or more appropriate adaptation engines. In an aspect, audio data included in video data may be separated from the video data at the media detection engine 230.

The speech adaptation engine 232 may be responsible for converting speech to text using a speech-to-text engine. Accordingly, when an audio user talks on a client (communication endpoint 110), the audio user's audio may be sent to the conference gateway 120 which may route the audio directly to the conference server 140 as well as the speech-to-text engine within the media adaption system 130. The speech-to-text engine within the media adaption system 130 may convert the speech to text and send the text converted from the speech to the conference server 140.

In an aspect, the speech-to-text engine may also contain voice recognition technology which may allow the speech-to-text engine to differentiate between different users on the same audio endpoint (communication endpoint 110). Accordingly, the converted text may be tagged with an indicator of each of the users. For example, text from each user may be tagged with the speaking user's name.

As discussed above, the speech-to-text component of the media adaption system 130 may be engaged before the conference server 140 so that the speech of individual clients may be converted before the conference audio is merged. The speech of individual clients being converted before the conference audio is merged may leads to more accurate translation, avoiding translation issues that could arise from multiple clients talking at the same time.

The text adaptation engine 234 may be responsible for converting text to speech using a text-to-speech engine. Accordingly, when a text-based user sends a text message from their client (communication endpoint 110), the conference gateway may route the text to both the conference server 140 and the text-to-speech engine of the media adaption system 130. The text-to-speech engine of the media adaption system 130 may send the resulting speech to the conference server 140. Sending the resulting speech to the conference server 140 may result in the conference server having both the audio form of the conference and the text form of the conference. In an aspect, the converted speech may include an audio tagged indicating who set the text.

The video adaptation engine 236 may be used to process video data. For example, the video adaptation engine 236 may be responsible for converting the video data to one or more other data types, e.g., speech data, text data, audio data, other data types, or some combination of data types. For example, video data may be converted to individual frames of the video data or small discrete video files that may be transmitted by email or another medium to users at the communication endpoints 110. In an aspect, video data may also include audio data. In an aspect, audio data from the video data may be processed at the video adaptation engine 236. In another aspect, audio data from the video data may be processed at the speech adaptation engine 232. In an aspect, the audio data may be separated from the video data at the video adaptation engine 236. In another aspect, the audio data may be separated from the video data at the media detection engine 230.

As discussed above, an aspect may be used with respect to social media. The social media adaptation engine 238 may include converters to convert social media data to one or more of audio, video, text, or another data type so that the social media data may be received and appreciated by the various users at the various communication endpoints 110. For example, social media may include one or more of audio data, text data, video data, computer files, or combinations of this data. Audio data, text data, video data may be converted as described above.

For example, in an aspect, audio data may be speech. The speech may be converted to text. The conversion may be performed by a speech-to-text engine in the social media adaptation engine 238. Alternatively, social media adaptation engine 238 may direct such data to the speech adaptation engine 232. The audio data may be a sound file that does not include speech. Accordingly, the sound file itself may be transmitted to users, e.g., using email addresses, over audio connections, or using other file transmission processes.

Text data may be processed by the social media adaptation engine 238, which may be responsible for converting text to speech using a text-to-speech engine. Alternatively, the social media adaptation engine 238 may direct the text to the text adaptation engine 234, which may be responsible for converting text to speech using a text-to-speech engine. Similarly, video data may also be processed by the social media adaptation engine 238 which may be responsible for converting the video data to one or more other data types, e.g., speech, text, audio, other data types, or some combination of data types. For example, video data may be converted to individual frames of the video data or small discrete video files that may be transmitted by email or another medium to users at the communication endpoints 110.

Computer files may be converted to other types of data for use in a conference. For example, each page of a document may be converted to a series of frames in a video file so that the pages may be viewed using a video conference. Other conversions are also possible. For example, pages of a document may be converted to text or to speech. In an aspect, only converting small portions of such a document may be preferable. Other types of computer files may also be converted to one or more of audio, video, text, or other data types.

Variants of this idea may be able to leverage the text and speech engines to deliver communication in a different way than the communication was produced. Another aspect may make use of automatic conversion of one media format to another, e.g., between audio and text, for jobs that may often be in audio sensitive environments to relay information to their employees, for example.

Figure 3:
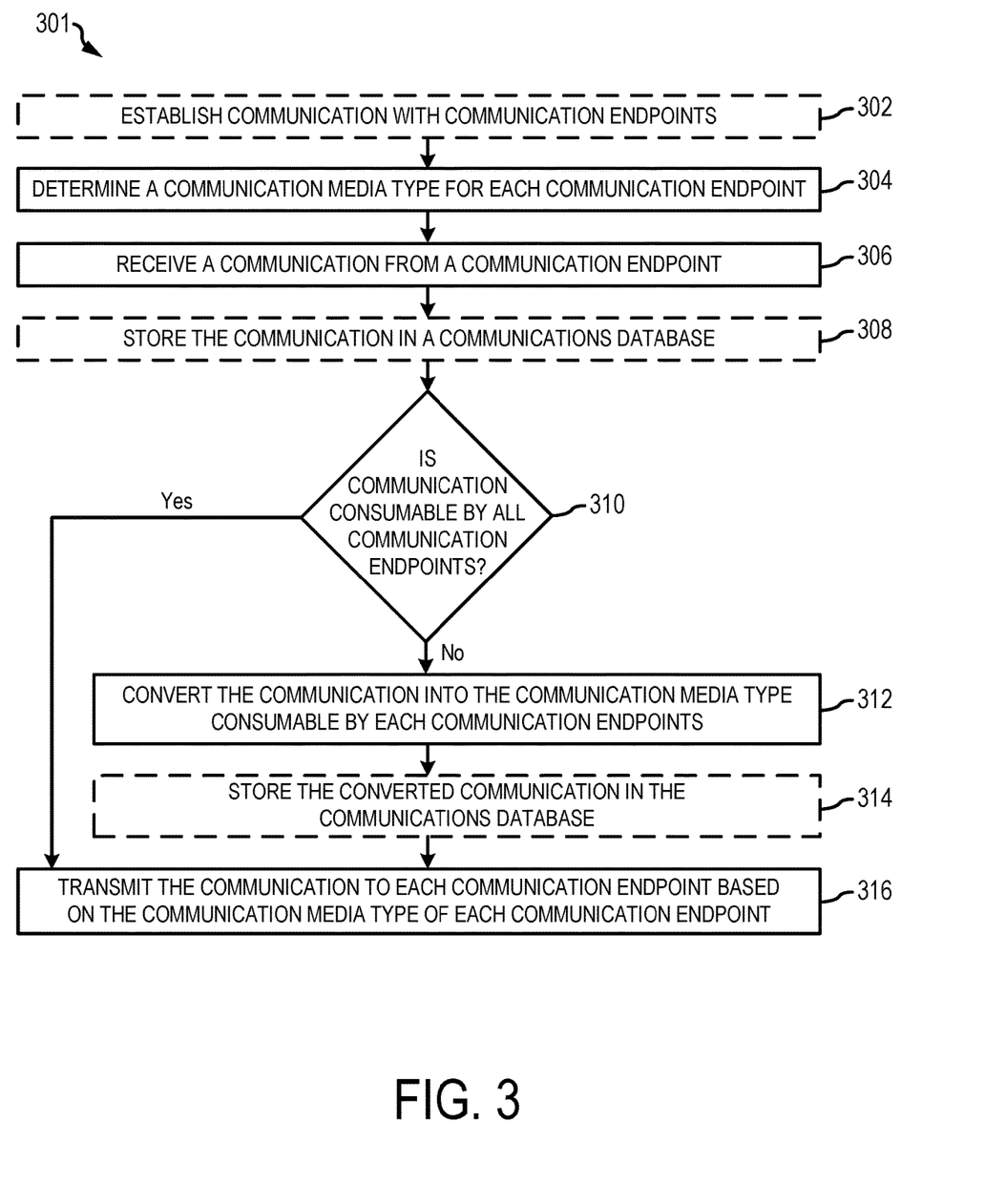
FIG. 3 illustrates a communication method in accordance with exemplary embodiments of the disclosure.

FIG. 3 illustrates a communication method 301 in accordance with exemplary embodiments of the disclosure. The communication method 301 includes establishing communication with communication endpoints 110 (step 302), determining a communication media type (or communication media types) for each communication endpoint 110 (step 304), receiving a communication from a communication endpoint 110 (step 306), storing the converted communication in the communications database (150) (step 308), determining when the communication may be received by all communication endpoints (step 310), converting the communication into the communication media type usable by each communication endpoints 110 (step 312), storing the converted communication in the communications database (150) (step 314), transmitting the communication to each communication endpoint 110 based on the communication media type of each communication endpoint 110 (step 316).

At step 302, communication may be established with communication endpoints 110. The communication may be established with communication endpoints be receiving a conference request from the communication endpoint 110 and adding the endpoint based on receiving the request. Furthermore, the communication may be established based on the type of communication being used by the communication endpoint 110. For example, the communication may be an audio-video communication, text communication, audio communication, email communication, or another type of communication. The communication system used may be any communication system appropriate for the particular type of communication used, e.g., audio-video communication, text communication, audio communication, email communication, or another type of communication.

At step 304, a communication media type (or communication media types) for each communication endpoint may be determined 110. For example, as discussed above, the communication may be an audio-video communication, text communication, audio communication, email communication, or another type of communication. Accordingly, a determination may be made for each communication endpoint 110-1, 110-2, 110-*n* of what type of communication or communications are used, e.g., audio-video communication, text communication, audio communication, email communication, or another type of communication. In an aspect, a system may receive a communication from a communication endpoint 110 and determine the type of communication received to determine the communication type for the endpoint, e.g., and audio-video communication, a text communication, an audio communication, email communication, or another type of communication. In another aspect, the conference request may include information on communication media type that may be used to determine the communication type.

For example, a computer-based system may determine a first communication media type of the first communication endpoint and a second communication media type of the second communication endpoint (step 304). In an aspect, the first communication media type or the second communication media type may include at least one of a text message communication, an audio communication, a video communication, or a social media communication. In an aspect, the first communication may include the text communication, and wherein the converting the communication data into the second communication comprises converting the communication data into at least one of the audio communication, the video communication, or the social media communication. In an aspect, the first communication may include the audio communication, and wherein the converting the communication data into the second communication comprises converting the communication data into at least one of the text communication, the video communication, or the social media communication. In an aspect, the first communication may include the video communication, and wherein the converting the communication data into the second communication comprises converting the communication data into at least one of the text communication, the audio communication, or the social media communication. In an aspect, the first communication may include the social media communication, and wherein the converting the communication data into the second communication comprises converting the communication data into at least one of the text communication, the audio communication, or the video communication. In an aspect, the first communication and the second communication may be transmitted closely enough in time to allow for discussion in the conference. In one example, closely enough in time to allow for discussion in the conference may be any time between 0 and 30 seconds. In another example, closely enough in time to allow for discussion in the conference may be approximately 0 to 3 second. Generally, the closer the first communication and the second communication are transmitted to each other, the more coherent the conference may be. However, for smaller values of time between the first communications and the second communication, e.g., 0 to 2 seconds, the less noticeable improvements may be to the users.

At step 306, a communication from a communication endpoint 110 may be received. For example, the computer-based system in electronic communication with a first communication endpoint and a second communication endpoint receives a first communication, including communication data. The communication data may include one or more of audio-video communication, text communication, audio communication, email communication, or another type of communication.

At step 308, the communication data (e.g., unconverted) may be stored in the communications database (150). For example, the communication database may include one or more of a text transcript database, an audio recording database, or another type of database for storing communication data. Accordingly, the communications database 150 may store one or more of audio-video communication, text communication, audio communication, email communication, or another type of communication.

At step 310, a determination may be made as to whether the communication may be used by all communication endpoints 110. For example, a system may know which endpoints may receive and process a particular communication type or types. The system may compare the communication type received to the types of communication that may be used by each of the communication endpoints. The determination may be made as to whether the communication may be usable by all communication endpoints 110 by comparing the communication types usable by each endpoint to the communication type received. When a communication may be useable by all communication endpoints 110, no conversion is needed. Accordingly, the communication may be transmitted to each communication endpoint 110 without conversion. For example, at step 310 a determination may be made to skip steps such as step 312 and step 314 to step 316. When a communication is not usable by all communication endpoints 110, conversion (step 312) may be needed.

At step 312, the communication may be converted into the communication media type usable by each communication endpoints 110. For example, the computer-based system converts the communication data into a second communication formatted according to the first communication media type or the second communication media type. For example, video communication, text communication, audio communication, email communication, or another type of communication may be converted to one or more of other communication types such as video communication, text communication, audio communication, email communication, or another type of communication.

At step 314, the converted communication may be stored in the communications database (150). For example, the communication database may include one or more of the text transcript database, an audio recording database, or another type of database for storing communication data. Accordingly, the communications database 150 may store one or more of audio-video communication, text communication, audio communication, email communication, or another type of communication.

At step 316, the communication may be transmitted to each communication endpoint 110 based on the communication media type of each communication endpoint 110. For example, the computer-based system transmits the first communication or the second communication to the first communication endpoint and the second communication endpoint based on a communication media type of each communication endpoint.

Figure 4:
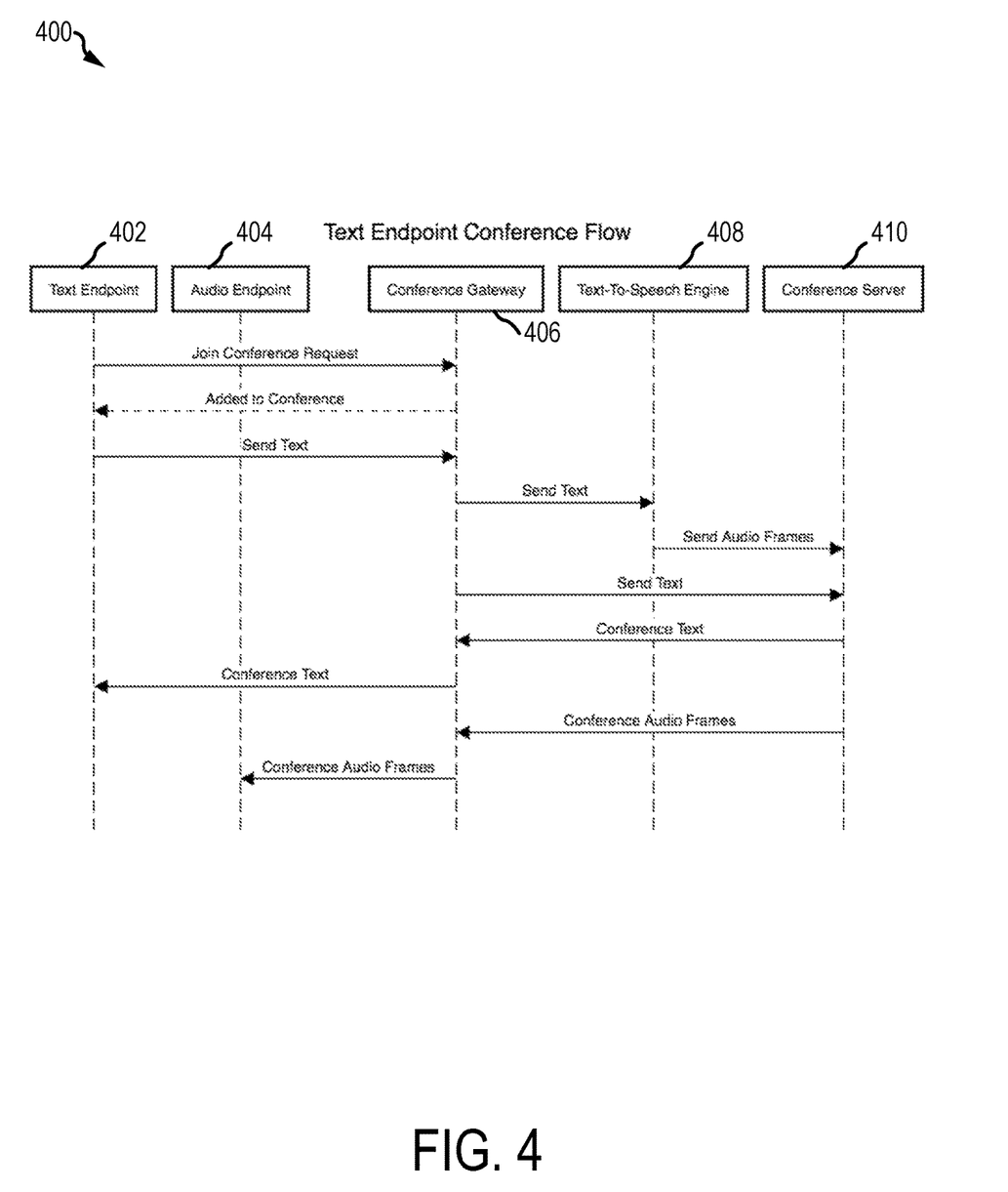
FIG. 4 is a diagram that illustrates a call flow in accordance with exemplary methods of the disclosure.

FIG. 4 is a diagram 400 that illustrates a call flow in accordance with exemplary methods of the disclosure. The diagram 400 illustrates call flows between a text endpoint 402 (e.g., one or more of communication endpoints 110-1, 110-2, 110-n of FIG. 1), an audio endpoint 404 (e.g., one or more of communication endpoint 110-1, 110-2, 110-n of FIG. 1), a conference gateway 406 (e.g., conference gateway 120 of FIG. 1), a text-to-speech engine 408 (e.g., within the media adaption system 130 of FIG. 1), and a conference server 410 (e.g., conference server 140 of FIG. 1). When an error is made in a modality, a communication may be transmitted by switching to another modality. For example, step 316 may be repeated using the correct modality. In an aspect, the modality used may be based on user preference. For example, a user may decide it is too noise to hear audio and may request a real-time or near real-time transcript that may be received by text messages, email, or other suitable methods of sending text.

In another aspect, a user may select to hear audio over headphones, earbuds, or other reasonably private audio device, but may choose to respond by text so as to not be overheard. In an aspect, when text is sent, an email thread may be used. The email thread may include emails for different portions of the conference, e.g., an email may be sent periodically as speech is converted to text, e.g., every 5 seconds, 10 seconds, 20 seconds, or any other period that may be convenient for a particular conference.

In an aspect, selection of modality may be location-based. For example, settings might be selected for home, work, car, airport, or other locations. For example, a user may select to hear audio over headphones, earbuds, or other reasonably private audio device, but may choose to respond by text so as to not be overheard at an airport. In another example, a user may select send and receive using text so as to not be overheard at an airport, e.g., when headphones, earbuds, or other reasonably private audio devices are not available or the user simply does not wish to use such devices.

The text endpoint 402 may transmit a request to join a conference to the conference gateway 406. Accordingly, the conference gateway 406 may receive the request to join the conference. Based on receiving the request to join the conference, the conference gateway 406 may add the text endpoint 402 to the conference. For example, the conference gateway 406 may transmit a message to the text endpoint 402. The message may indicate that the text endpoint 402 has been added to the conference. Alternatively, in another aspect, the conference gateway 406 may add the text endpoint 402 to the conference at the conference gateway 406 without transmitting a message to the text endpoint 402, as indicated by the dashed line.

The text endpoint 402 may transmit a text message for the conference to the conference gateway 406. Accordingly, the conference gateway 406 may receive the text message for the conference from the text endpoint 402. When the conference gateway 406 receives the text message from the text endpoint 402, the conference gateway 406 may transmit the text message to the text-to-speech engine 408.

The text-to-speech engine 408 may receive the text message from the conference gateway 406. When the text-to-speech engine 408 receives the text message from the conference gateway 406, the text-to-speech engine 408 may convert the received text message to speech. The speech from the converted text message may be stored as audio frames.

The text-to-speech engine 408 may transmit the audio frames of the speech generated by the text-to-speech engine 408 from the received text message for the conference to the conference server 410. Accordingly, the conference server 410 may receive the audio frames of the speech generated by the text-to-speech engine 408. For example, the audio frames may be received from the text-to-speech engine 408. The audio frames may be an audio representation of the text, e.g., speech.

When the conference gateway 406 receives the text message from the text endpoint 402, the conference gateway 406 may also transmit the text message to the conference server 410. Accordingly, the conference server 410 may receive the text message and the corresponding speech (as one or more audio frames) related to the text message. Thus, the conference server 410 may transmit the text message as conference text and the corresponding speech as conference audio frames to the conference gateway 406.

The conference gateway 406 may transmit the conference text to the text endpoint 402. In an aspect, the conference gateway 406 may not transmit text originating from a particular text endpoint 402 to that particular text endpoint 402. In another aspect, all conference text may be transmitted to all text endpoints 402. In an aspect, a text endpoint may filter out text that that particular text endpoint 402 has generated such that the text transmitted by that particular endpoint is not presented to an end-user of that particular text endpoint 402.

The conference gateway 406 may also transmit the conference audio frames to the audio endpoint 404. In an aspect, the conference gateway 406 may not transmit the conference audio frames originating from a particular audio endpoint 404 to that particular audio endpoint 404.

In another aspect, all conference audio frames may be transmitted to all audio endpoints 404. In an aspect, an audio endpoint may filter out audio frames that that particular audio endpoint 404 has generated such that the text transmitted by that particular audio endpoint 404 is not presented to an end-user of that particular audio endpoint 404.

Figure 5:
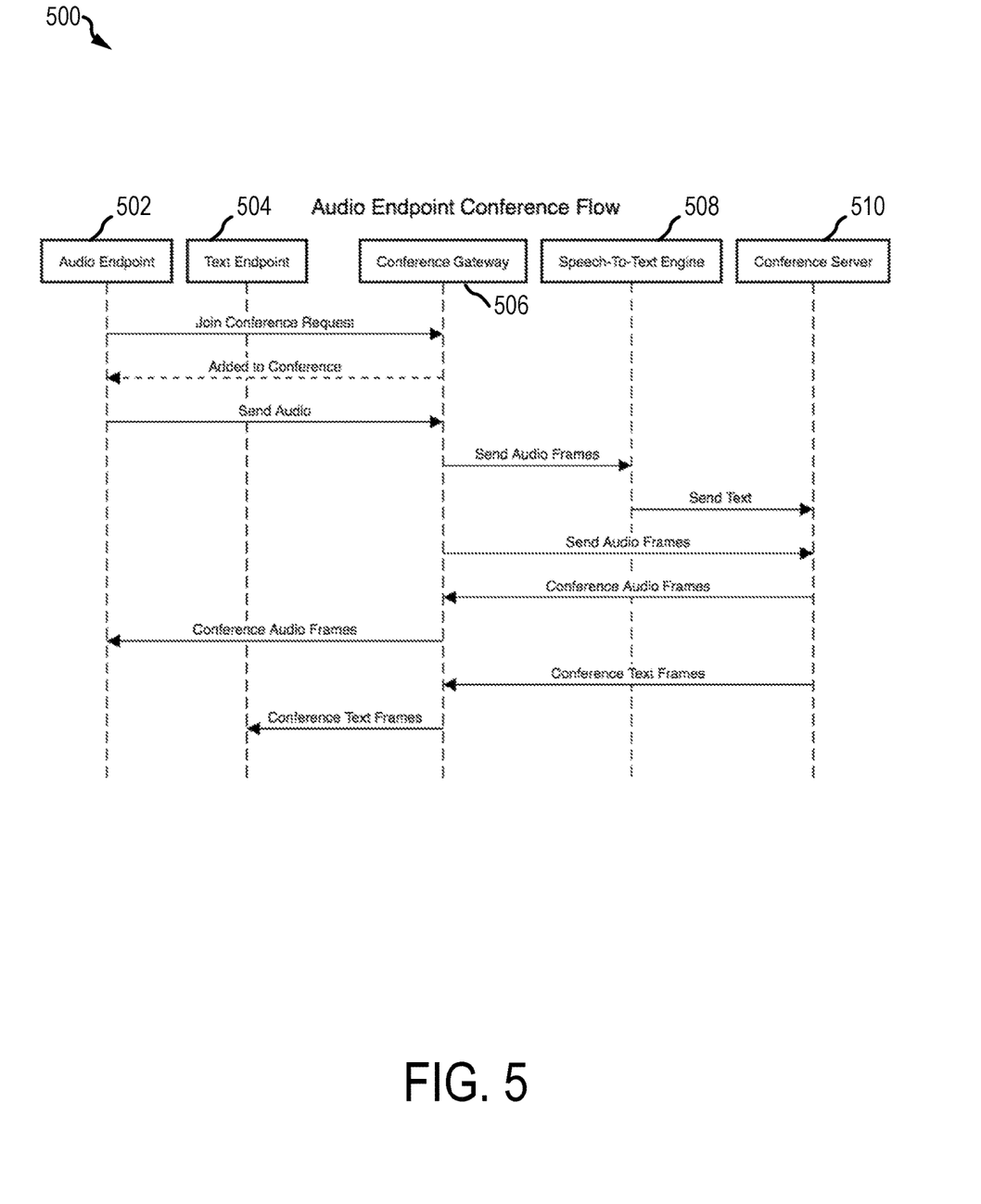
FIG. 5 is a diagram that illustrates a call flow in accordance with exemplary methods of the disclosure.

FIG. 5 is a diagram 500 that illustrates a call flow in accordance with exemplary methods of the disclosure. The diagram 500 illustrates call flows between an audio endpoint 502 (e.g., one or more of communication endpoints 110-1, 110-2, 110-n of FIG. 1), a text endpoint 504 (e.g., one or more of communication endpoint 110-1, 110-2, 110-n of FIG. 1), a conference gateway 506 (e.g., conference gateway 120 of FIG. 1), a speech-to-text engine 508 (e.g., within the media adaption system 130 of FIG. 1), and a conference server 510 (e.g., conference server 140 of FIG. 1).

The audio endpoint 502 may transmit a request to join a conference to the conference gateway 506. Accordingly, the conference gateway 506 may receive the request to join the conference. Based on receiving the request to join the conference, the conference gateway 506 may add the audio endpoint 502 to the conference. For example, the conference gateway 506 may transmit a message to the audio endpoint 502. The message may indicate that the audio endpoint 502 has been added to the conference. Alternatively, in another aspect, the conference gateway 506 may add the audio endpoint 502 to the conference at the conference gateway 506 without transmitting a message to the audio endpoint 502, as indicated by the dashed line.

The audio endpoint 502 may transmit an audio message for the conference to the conference gateway 506. Accordingly, the conference gateway 506 may receive the audio message for the conference from the audio endpoint 502. When the conference gateway 506 receives the audio message from the audio endpoint 502, the conference gateway 506 may transmit the audio message to the speech-to-text engine 508.

The speech-to-text engine 508 may receive the audio message from the conference gateway 506. When the speech-to-text engine 508 receives the audio message from the conference gateway 506, the speech-to-text engine 508 may convert the received audio message to text.

The speech-to-text engine 508 may transmit the text generated by the speech-to-text engine 508 from the received audio message for the conference to the conference server 510. Accordingly, the conference server 510 may receive the text generated by the speech-to-text engine 508. For example, the text may be received from the speech-to-text engine 508. The text may be a text representation of the audio (e.g., speech) received.

When the conference gateway 506 receives the audio message from the audio endpoint 502, the conference gateway 506 may also transmit the audio frames to the conference server 510. Accordingly, the conference server 510 may receive the speech or audio (as one or more audio frames) and the corresponding text message related to the audio message. Thus, the conference server 510 may transmit the audio message as conference audio frames and the corresponding conference text to the conference gateway 506.

The conference gateway 506 may transmit the conference audio frames to the audio endpoint 502. In an aspect, the conference gateway 506 may not transmit audio originating from a particular audio endpoint 502 to that particular audio endpoint 502. In another aspect, all conference audio frames may be transmitted to all audio endpoints 502. In an aspect, an audio endpoint may filter out audio frames that that particular audio endpoint 502 has generated such that the audio frames transmitted by that particular endpoint is not presented to an end-user of that particular audio endpoint 502.

The conference gateway 506 may also transmit the conference text to the text endpoint 504. In an aspect, the conference gateway 506 may not transmit the conference text originating from a particular text endpoint 504 to that particular text endpoint 504.

In another aspect, all conference text may be transmitted to all text endpoints 504. In an aspect, a text endpoint 504 may filter out conference text for that that particular text endpoint 504 has generated such that the text transmitted by that particular text endpoint 504 is not presented to an end-user of that particular text endpoint 504.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. The features of the various embodiments may be stand-alone or combined in any combination. Further, unless otherwise noted, various illustrated steps of a method can be performed sequentially or at the same time, and not necessarily be performed in the order illustrated. It will be recognized that changes and modifications may be made to the exemplary embodiments without departing from the scope of the present invention. These and other changes or modifications are intended to be included within the scope of the present invention, as expressed in the following claims.

What is claimed is:

1. A communication system comprising:
   a processor; and
   a tangible, non-transitory memory configured to communicate with the processor, the tangible, non-transitory memory having instructions stored thereon that, in response to execution by the processor, cause the processor to perform operations comprising:
   receiving, by the processor in electronic communication with a plurality of communication endpoints, a first communication, wherein the first communication comprises communication data formatted according to a first communication media type;

determining, by the processor, an endpoint communication media type for each of the plurality of communication endpoints based on a user preference for at least one of the plurality of communication endpoints, the user preference comprising at least one of an endpoint location preference, a communication topic preference, and a communication speaker preference;

converting, by the processor, the communication data into a second communication formatted according to the endpoint communication media type;

transmitting, by the processor, the first communication or the second communication to each of the plurality of communication endpoints based on the endpoint communication media type for each of the plurality of communication endpoints;

receiving, by the processor, a third communication from a communication endpoint of the plurality of communication endpoints, wherein the third communication comprises second communication data formatted according to a second communication media type;

converting, by the processor, the second communication data into a fourth communication formatted according to the first communication media type; and transmitting, by the processor, the third communication or the fourth communication to each of the plurality of communication endpoints based on the endpoint communication media type for each of the plurality of communication endpoints.

2. The communication system of claim 1, wherein the determining the endpoint communication media type comprises:

determining, by the processor, au endpoint location of a first communication endpoint from the plurality of communication endpoints; and comparing, the endpoint location to the endpoint location preference to determine the endpoint communication media type.

3. The communication system of claim 1, further comprising:

receiving, by the processor, an error notification from a communication endpoint of the plurality of communication endpoints;

converting, by the processor, the communication data into a reformatted communication formatted according to a second endpoint communication media type; and transmitting, by the processor, the reformatted communication to the communication endpoint.

4. The communication system of claim 1, wherein the first communication media type or the endpoint communication media type comprises at least one of a text communication, an audio communication, a video communication, and a social media communication.

5. The communication system of claim 4, wherein the text communication comprises at least one of a short message service (SMS) text, a multimedia message service (MMS) text, an email, a chat, and a web-based text platform.

6. The communication system of claim 1, wherein transmitting, by the processor, the first communication or the second communication to each of the plurality of communication endpoints further comprises transmitting the second communication based on a dropped communication between at least two of the plurality of communication endpoints to a new endpoint.

7. The communication system of claim 1, wherein converting, by the processor, the communication data into a second communication formatted according to the endpoint communication media type comprises converting a document into a series of frames in a video file.

8. The communication system of claim 1, wherein the first communication media type comprises audio data including speech and speech of an individual clients is converted before audio of the speech is merged into the first communication.

9. The communication system of claim 1, wherein the user preference comprising at least one of the communication topic preference and the communication speaker preference.

10. A method comprising:

receiving, by a computer-based system in electronic communication with a first communication endpoint and a second communication endpoint, a first communication comprising communication data;

determining, by the computer-based system, a first communication media type of the first communication endpoint and a second communication media type of the second communication endpoint, the determining based on a user preference for at least one of the communication endpoints, the user preference comprising at least one of an endpoint location preference, a communication topic preference, and a communication speaker preference;

converting, by the computer-based system, the communication data into a second communication formatted according to the first communication media type or the second communication media type;

and transmitting, by the computer-based system, the first communication or the second communication to the first communication endpoint and the second communication endpoint based on a communication media type of each communication endpoint, wherein transmitting the second communication based on a dropped communication between at least two of the communication endpoints to a new endpoint.

11. The method of claim 10, wherein the first communication media type or the second communication media type comprises at least one of a text communication, an audio communication, a video communication, and a social media communication.

12. The method of claim 11, wherein the first communication comprises the text communication, and wherein the converting the communication data into the second communication comprises converting the communication data into at least one of the audio communication, the video communication, and the social media communication.

13. The method of claim 11, wherein the first communication comprises the audio communication, and wherein the converting the communication data into the second communication comprises converting the communication data into at least one of the text communication, the video communication, and the social media communication.

14. The method of claim 11, wherein the first communication comprises the video communication, and wherein the converting the communication data into the second communication comprises converting the communication data into at least one of the text communication, the audio communication, and the social media communication.

15. The method of claim 11, wherein the first communication comprises the social media communication, and wherein the converting the communication data into the second communication comprises converting the communication data into at least one of the text communication, the audio communication, and the video communication.

16. The method of claim 10, wherein the first communication and the second communication are transmitted closely enough in time to allow for discussion in a conference.

17. A communications system comprising:
a plurality of communication endpoints each comprising a communication media type, the communication media type based on a user preference for at least one of the plurality of communication endpoints, the user preference comprising at least one of an endpoint location preference, a communication topic preference, and a communication speaker preference; and
a communication server in electronic communication with each of the plurality of communication endpoints, the communication server comprising:
a processor; and
a tangible, non-transitory memory configured to communicate with the processor, the tangible, non-transitory memory having instructions stored thereon that, in response to execution by the processor, cause the processor to perform operations comprising:
receiving, by the processor, a first communication from a first communication endpoint of the plurality of communication midpoints, wherein the first communication comprises communication data formatted according to a first communication media type;
converting, by the processor, the communication data into a second communication formatted according to a second communication media type;
transmitting, by the processor, the first communication or the second communication to each of the plurality of communication endpoints based on the communication media type for each of the plurality of communication endpoints;
receiving, by the processor, a third communication from a communication endpoint of the plurality of communication endpoints, wherein the third communication comprises second communication data formatted according to a second communication media type;
converting, by the processor, the second communication data into a fourth communication formatted according to the first communication media type; and
transmitting, by the processor, the third communication or the fourth communication to each of the plurality of communication endpoints based on the endpoint communication media type for each of the plurality of communication endpoints.

18. The communications system of claim 17, further comprising establishing, by the processor, electronic communication with each of the plurality of communication endpoints.

19. The communications system of claim 17, wherein the communication media type comprises at least one of a text communication, an audio communication, a video communication, and a social media communication.

* * * * *